United States Patent [19]

Setaka

[11] 4,377,565
[45] Mar. 22, 1983

[54] PROCESS FOR PRODUCING DIAMOND POWDER BY SHOCK COMPRESSION

[75] Inventor: Nobuo Setaka, Nagareyama, Japan

[73] Assignee: National Institute for Researches in Inorganic Materials, Ibaraki, Japan

[21] Appl. No.: 332,204

[22] Filed: Dec. 18, 1981

Related U.S. Application Data

[63] Continuation of Ser. No. 163,947, Jun. 30, 1980, abandoned.

[30] Foreign Application Priority Data

Aug. 10, 1979 [JP] Japan ................................ 54-102541

[51] Int. Cl.³ .......................... C01B 31/06; B01J 3/08
[52] U.S. Cl. .................................................... 423/446
[58] Field of Search ................................ 423/446, 445

[56] References Cited

U.S. PATENT DOCUMENTS 3,238,019  3/1966  Decarli ................................ 423/446
3,401,019  9/1968  Cowan et al. ...................... 423/446

FOREIGN PATENT DOCUMENTS 54-4298  1/1979  Japan ................................... 423/446
1115648  5/1968  United Kingdom .

OTHER PUBLICATIONS

Wentorf, "J. Physical Chemistry", vol. 69, No. 9, 1965, pp. 3063-3069.
Setaka et al., "J. American Ceramic Society", vol. 63, No. 3-4, Mar.-Apr. 1980, pp. 238-239.

Primary Examiner—Edward J. Meros
Attorney, Agent, or Firm—Oblon, Fisher, Spivak, McClelland & Maier

[57] ABSTRACT

A diamond powder is produced by a shock compressing method using a carbon precursor obtained by an organic compound such as furan resin, its derivative, a thermosettable resin, as a carbon source.

8 Claims, 3 Drawing Figures

PROCESS FOR PRODUCING DIAMOND POWDER BY SHOCK COMPRESSION

This is a continuation of application Ser. No. 163,947 filed June 30, 1980 now abandoned.

BACKGROUND OF THE INVENTION

1. Field of the Invention

The present invention relates to an improved process for producing diamond powder by a shock compressing method.

2. Description of the Prior Art

The shock compressing method of producing a diamond powder is a process for producing a diamond powder by a shocking high pressure and high temperature which are instantaneously caused by a strong shock wave generated by a collision of a flyer plate propelled by a detonation of an explosive to a sample vessel.

A transformation of a carbon source into diamond by an impact compressing method has been considered to be a martenstic transformation for converting an atomic arrangement by slightly shifting adjacent atoms and contracting each layers distance of hexagonal network of graphite crystal in certain mutual relation and not to substantially cause a diffusion of carbon atoms. Therefore, in the conventional process for producing diamond powder by the shock compressing method, artificial graphite or natural graphite has been used as a starting material.

When the crystalline carbon source is used as the starting material, the following disadvantages have been found.

(1) A pressure of higher than 100 GPa is required to obtain an yield of diamond of more than 50%.

| Shocking pressure (GPa) | Yield of diamond (%) |
| --- | --- |
| 140 | 52–32 |
| 90 | 12 |
| 78 | 5 |

(See G.B. Pat. No. 1,115,648)

(2) It is difficult to separate the resulting diamond powder from the unconverted graphite. For example, in the conventional process lead oxide as an oxidizing agent is admixed with the product obtained by the shock compression and the mixture is heated at about 450° C. for 2 hours to oxidize the unconverted graphite and lead oxide is dissolved with acetic acid to separate diamond. Such complicated separating steps can be eliminated.

SUMMARY OF THE INVENTION

It is an object of the present invention to overcome the above-mentioned disadvantages of the conventional process and to provide a process for producing a diamond powder under relatively low shock compression in a high yield.

It is another object of the present invention to provide a process for easily separating a diamond powder from the unconverted carbon source.

The foregoing and other objects of the present invention have been attained by producing a diamond powder by a shock compressing method using a carbon precursor obtained from an organic compound as a carbon source. The carbon precursor is preferably obtained from furan resin, its derivative, a thermosettable resin of a phenol formaldehyde resin or its mixture or cellulose.

The thermosettable resins means resins which are carbonized by heating without substantially melting. The thermosettable resins are described in Encyclopedia Polymer Science and Technology Vol. 1 to 15 which include furan resins (Pages 432 to 455 in Vol. 7) and epoxy resins and unsaturated polyester resins. The carbon precursor can be admixed with a heat conductive metal powder and the mixture is compressed to have a porosity of less than 30% under shock-compressed by impact pressure of 40–100 GPa.

DETAILED DESCRIPTION OF THE PREFERRED EMBODIMENTS

Figure 1:
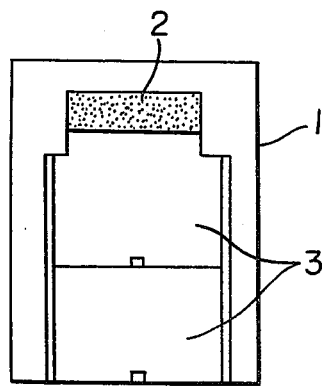

The inventors have studied to attain the objects of the present invention and have found that the objects have attained by using a carbon precursor obtained by heat-treating the organic compound especially furan resin, its derivative, a thermosettable resin of phenol resin or its mixture which is not melted by heating at 400° to 1,000° C. preferably 400° to 600° C. The present invention has been attained by the finding.

When the organic compound is heated, it is converted into a black solid at about 400° to 600° C. The present invention has been attained by the finding.

When the organic compound is heated, it is converted into a black solid at about 400° to 500° C. The solid seems to be carbon but contains the other atom such as oxygen, hydrogen, or nitrogen atom depending upon the starting material. For example, a carbon precursor obtained by heat-treating a furan resin or a phenol resin at 500° C. has a carbon content of about 87% and a carbon precursor obtained from a petroleum pitch has a carbon content of about 93%.

The structure of the carbon precursor is depending upon the starting material and the degree of the reaction to give (1) a plane condensed polycyclic structure or
(2) a three dimentional structure.

They are random layer structure piling condensed polycyclic planes and a structure of combining three dimentional structures such as tetrahedron carbon and aromatic crosslinkage. The ratio of each of the structure is depending upon the starting material and the heating condition. The carbon precursor used in the process of the present invention is especially preferable to be a carbon precursor of a thermosettable resin having predominant three dimensional structure.

A grain size of the carbon precursor used in the present invention is less than $200\mu$ preferably less than $50\mu$. When the grain size is smaller, the area for contacting with a metal powder as a coolant is increased to reduce heat caused by the shock compression.

When the temperature of higher than 1,800° C. is remained after applying the shock wave, the resulting diamond is reversely transformed to carbon, and an yield of diamond is low. Therefore, it is preferable to admix a heat conductive powder such as iron and copper powder with the carbon precursor. The mixture is compressed to obtain a sample having a porosity of less than 30% by a compress-molding. The shocking temperature caused by the shock compression is depending upon a shocking pressure, the shock impedance of cooling medium and also a porosity of a molded product which will be shock-compressed. It is preferable to reduce the porosity of the molded product.

A grain size of the heat conductive powder such as iron or copper powder is preferably less than 200μ especially less than 50μ as the reason of the definition of the carbon precursor.

A ratio of the metal powder to the carbon precursor is more than 80 wt.%. When the ratio is less than 80 wt.%, there is a possibility of the reverse transition of the resulting diamond. The optimum ratio is about 95 wt.%. When a porosity of the molded product is more than 30%, shocking temperature resulted in the shocking high pressure is remarkably high. In order to prevent such heating, the porosity should be less than 30%.

A shocking high pressure of 40 to 150 GPa is applied to the molded powder. When it is less than 40 GPa, the pressure for producing diamond is not enough whereas when it is more than 150 GPa, excess heating is caused to reduce an yield.

The shock compression is preferably carried out by collision of a flyer or projectile plate to a sample vessel by a detonation of an explosive. Thus, it is possible to apply the shock compression by the other shock compressing method.

The diamond powder is separated from the product obtained by the shock compressing method. In the separation, the product is treated in a solution obtained by dissolving a small amount of sodium chlorate in a concentrated nitric acid and heating at near the boiling point whereby the diamond is easily separated by dissolving the unconverted carbon. The insoluble powder is white and is confirmed to be diamond by an X-ray diffraction method and an electron diffraction method.

As described above, in accordance with the process of the present invention, the diamond powder can be obtained under relatively lower pressure at a higher conversion in comparison with those of the conventional shock compressing method. The diamond powder can be easily separated from the unconverted carbon. These are remarkable advantages. The shock compressing means can be the conventional means. In view of the lower pressure and the easy separation, the cost for production is advantageously low.

The present invention will be further illustrated by certain examples and references which are provided for purposes of illustration only and are not intended to be limiting the present invention.

EXAMPLE 1

Figure 2:
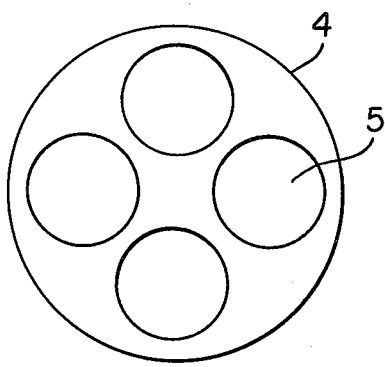
Figure 3:
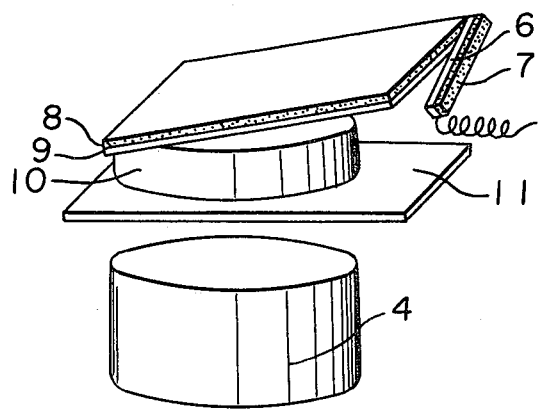

A furan resin obtained by thermosetting furfuryl alcohol in the presence of an organic acid was heated at a rate of 5° C./min. in a nitrogen atmosphere and aged at 500° C. for 3 hours to obtain a carbon precursor. The carbon precursor was pulverized to be an average particle size of 50μ and 4 wt.% of the carbon precursor was admixed with 96 wt.% of copper powder having an average paticle size of 100μ The mixture (2) was packed into a stainless capsule (1) shown in FIG. 1 and compressed by a pressing and further screw-fastened by screws (3). The capsule (1) was inserted into an iron holder (4) having capsule recesses (5) shown in FIG. 2. FIG. 3 is a schematic view for illustrating a shock compressing method using a flyer plate. An aluminum (6) (2.0 mm thickness) was propelled by an explosion of an initiating explosive made of the aluminum rod (6) coated with an explosive (7) to collide the aluminum rod (6) to an explosive (8). The explosion was resulted to propelled the flyer plate (9) made of aluminum (2.0 mm thickness). The flyer plate (9) simultaneously collide to a main explosive (10) whereby the explosion was simultaneously initiated to apply a plane shock wave to an iron plate (11) (3.2 mm thickness) propelled at velocity of 3.6, 2.6 and 1.9 km/sec. against a capsule made of stainless steel. The capsule (1) was shocked by the flyer plate to apply the plane shock to the powder (2) whereby the shock wave is passed through the sample to generate high pressure and high temperature. The impact pressure induced in the capsule was estimated to be 100, 60 and 40 GPa using impedance maching method. After the shock compressing treatment, the sample was taken out from a stainless steel capsule and dipped in 20% dilute nitric acid to dissolve the copper component and a precipitate was separated by a filtration.

In order to dissolve the unconverted carbon, the precipitate was treated in a concentrated nitric acid containing 0.1 mole % of sodium chlorate at 80° C. for 30 minutes to obtain a powdery crystal having substantially white color. The powdery crystal was confirmed to be diamond having cubic crystal structure by an electron diffraction. The yield of the diamond recovered is about 64% at shock pressure of 100 GPa, 68% at 60 GPa and 60% at 40 GPa.

EXAMPLE 2

In accordance with the process of Example 1, a furan resin obtained from furfuryl alcohol with 10 wt.% of a metallic copper as a coolant in the presence of an organic acid was heat-treated and shock-compressed at shock pressure of 60 GPa. The yield of the diamond recovered is about 68%.

EXAMPLE 3

In accordance with the process of Example 1, the mixture of furan resin with phenol formaldehyde resin was heat-treated and shock-compressed at shock pressure of 60 GPa. The yield of the diamond recovered is about 61%.

I claim:

1. In a process for producing a diamond powder by a shock compressing method, an improvement characterized by applying the shock compression to a carbon precursor obtained by heating at about 400° to 500° C. and thereafter pulverizing an organic compound which is not substantially melted by heating at 400° to 1000° C. and which is a thermosettable resin or cellulose, as a carbon source.

2. The process according to claim 1 wherein said carbon precursor is obtained from a thermosettable resin.

3. The process according to claim 1 wherein a heat conductive metal powder is admixed with said carbon precursor at a ratio of more than 80 wt.% of said metal powder to said carbon precursor, and said mixture is molded or compressed to porosity of less than 30% and a shock compression of 40 to 150 GPa is applied to the molded product.

4. The process according to claim 1 wherein an explosion wave is utilized for said shock compression.

5. The process according to claim 2 wherein said carbon precursor is obtained from a furan resin.

6. The process according to claim 1 wherein said carbon precursor is obtained from cellulose.

7. The process according to claim 2 wherein said carbon precursor is obtained from a mixture of furan resin with a phenol formaldehyde resin.

8. In a process for producing a diamond powder by a shock compressing method, an improvement characterized by applying the shock compression to a carbon precursor obtained by heating in a nitrogen atmosphere at about 400° to 500° C. and thereafter pulverizing a furan resin obtained by thermosetting furfuryl alcohol in the presence of an organic acid, the carbon precursor being admixed with conductive metal powder at a ratio of more than 80 wt.% of said metal powder to said carbon precursor, and said mixture is molded and compressed to a porosity of less than 30% and a shock compression of 40 to 150 GPa is applied to the molded product by an explosion wave.

* * * * *